United States Patent [19]

Garoff et al.

[11] Patent Number: 4,780,438
[45] Date of Patent: Oct. 25, 1988

[54] CATALYST COMPONENT FOR ALPHA OLEFINE-POLYMERIZING CATALYSTS AND PROCEDURE FOR MANUFACTURING THE SAME

[75] Inventors: Thomas Garoff; Barbro Löfgren, both of Helsinki, Finland; Luciano Luciani, Ferrara, Italy

[73] Assignee: Neste Oy, Finland

[21] Appl. No.: 34,168

[22] Filed: Apr. 1, 1987

[30] Foreign Application Priority Data

Apr. 1, 1986 [FI] Finland .................................. 861385

[51] Int. Cl.$^4$ ................................................ C08F 4/64
[52] U.S. Cl. ..................................... 502/107; 502/119; 502/123; 502/125; 502/126; 502/127; 502/133; 502/134; 526/124; 526/125
[58] Field of Search ............... 502/107, 119, 123, 125, 502/126, 127, 133, 134

[56] References Cited

U.S. PATENT DOCUMENTS

| | | | |
|---|---|---|---|
| 3,953,414 | 4/1976 | Galli et al. ...................... | 502/134 X |
| 4,107,415 | 8/1978 | Giannini et al. ................. | 502/125 X |
| 4,226,741 | 10/1980 | Luciani et al. .................. | 502/127 X |
| 4,487,845 | 12/1984 | Triplett ............................ | 502/107 |
| 4,529,716 | 7/1985 | Banzi et al. ..................... | 582/134 X |
| 4,532,313 | 7/1985 | Matlack ........................... | 502/134 X |
| 4,544,717 | 10/1985 | Mayr et al. ..................... | 502/127 X |

Primary Examiner—Patrick P. Garvin
Attorney, Agent, or Firm—Steinberg & Raskin

[57] ABSTRACT

A catalyst component for alpha olefine-polymerizing catalysts which comprise an organo-aluminum compound, an external electron donor, and a solid catalyst component obtained when a solid carrier component containing magnesium has reacted with a titanium halide compound, in addition to a procedure for manufacturing the same. The catalyst component is produced by reacting a solid carrier component with a titanium halide compound with or without the presence of an internal electron donor. The solid carrier component is prepared by (a) dissolving a natural or synthetic mineral containing magnesium and aluminum in hydrochloric acid,
(b) evaporating the solution until dry,
(c) calcinating the obtained salt mixture from the evaporated solution by heating the same at a temperature of about 130°–150° C. to convert the aluminum component into hydroxy form,
(d) dissolving the magnesium component in ethanol,
(e) drying the ethanol solution of the magnesium component with the aid of periodic azeotropic distillation, and
(f) precipitating the solid carrier component from the ethanol solution.

6 Claims, No Drawings

CATALYST COMPONENT FOR ALPHA OLEFINE-POLYMERIZING CATALYSTS AND PROCEDURE FOR MANUFACTURING THE SAME

BACKGROUND OF THE INVENTION

The invention concerns a catalyst component for an alpha olefine polymerizing catalyst which comprises an organo-aluminum compound and electron donor, and a solid catalyst component which is obtained when a compound containing magnesium has reacted with a titanium halide compound. The present invention is also directed to a procedure for manufacturing this catalyst component, and to a procedure for polymerizing alpha olefines, especially propylene, which makes use of the catalyst component.

Catalysts known in the prior art with high activity for polymerizing alpha olefines, which have been manufactured include an aluminum alkyl compound, an electron donor, and a halogenated titanium compound on a carrier substance comprising various magnesium compounds. Chlorinated magnesium compounds have generally been used as the magnesium compound, which may be, for instance, water-free magnesium chloride alone or together with other magnesium compounds, or an organic magnesium compound which has been prepared by halogenating organic magnesium compounds with the aid of chlorine-containing compounds.

In polymerizing catalysts of this type, the properties of the solid carrier component have significant influence upon the properties of the ultimate catalyst, e.g. upon its activity. These properties can be substantially influenced through the mode of manufacturing of the carrier component.

The present invention concerns a catalyst in whict the carrier component has been prepared from minerals containing magnesium and aluminum, which may be natural or synthetic minerals. An example of this type of mineral is hydrotalsite, and its composition is indicated by the following formula:

ti $Mg_4Al_2(OH)_{12}CO_3 3H_2O$

Hydrotalsite also occurs in several other forms. Thus, $Mg_{4.5}Al_2(OH)_{13} 4H_2O$, $Mg_2Al_2(OH)_8 CO_3 3H_2O$ and $Mg_6Al_2(CO_3)(OH)_{16} 4H_2O$ are also hydrotalsites. Other minerals containing magnesium and aluminum are, for instance, indigirite $Mg_2Al_2(CO_3)_4(OH)_2 15H_2O$ and manassite $Mg_6Al_2(CO_3)(OH)_{16} 4H_2O$.

Magnesium minerals have been used as starting material in preparing inert carrier components for Ziegler-Natta catalysts for the purpose of polymerizing olephines. In DE Patent No. 2,614,325, a procedure is disclosed in which hydrotalsite is calcinated by heating for several hours at high temperature, whereby it is totally converted into a mixture of magnesium and aluminum oxides, which is totally water-free. Catalyst carriers have been prepared from this mixture, by treating the same with titanium tetrachloride, after which an active Ziegler-Natta catalyst has been obtained for the purpose of polymerizing olefines, especially ethylene.

As disclosed in DE Patent No. 3,036,450, polymerizing catalysts have been prepared from hydrotalsite by mixing the same in hexane at room temperature. A solid substance is then added, which has been obtained by grinding magnesium chloride for several hours in the presence of titanium tetrachloride in a nitrogen atmosphire. Catalysts prepared in this manner are applied for polymerizing ethylene, which is not as sensitive to the effect of moisture as propylene polymerizing. If the catalyst carrier contains water, then a catalyst is obtained which is inactive in propylene polymerizing.

It has turned out to be difficult to manufacture from hydrotalsite and equivalent mineralcontaining aluminum, active Ziegler-Natta catalysts, in particular those for the polymerizing of propylene, because in these processes the catalysts are extremely sensitive to moisture and to the crystal water present in the carrier. Even minimal quantities of crystal (crystallized) water already lower the activity of the catalyst significantly. This is probably due to the aluminum in the mineral, which impairs the activity of the catalyst and inhibits liberation of the crystal water from the carrier.

SUMMARY OF THE INVENTION

Accordingly, it is an object of the present invention to improve polymerizing of olefines, notably propylene.

It is also an object of the present invention to provide a new and improved catalyst component for carrying out the polymerizing of the olefines.

It is a further object to provide a method for manufacturing a catalyst component for use in the polymerizing of olefines.

These and other objects are attained by the present invention which is directed to a catalyst component for an alpha olefine-polymerizing catalyst which comprises an organo aluminum compound, an external electron donor, and a solid catalyst component obtained when a solid carrier component containing magnesium has reacted with titanium halide compound and which is free of the drawbacks noted above and therefore suitable for use in the polymerizing of the olefines, notably propylene. In particular, the catalyst component (i.e. carrir component) for the alpha olefine polymerizing is prepared by (a) dissolving a natural or synthetic mineral containing magnesium and aluminum in hydrochloric acid to prepare a solution, (b) evaporating the thus-prepared solution until dry, to obtain a salt mixture, (c) calcinating the thus-obtained salt mixture by heating the same at a temperature of about 130°–150° C. in order to convert the aluminum component into hydroxide, (d) dissolving the magnesium component in ethanol, to form a solution, (e) subjecting the thus-obtained ethanol solution of the magnesium component to azeotropic distillation to remove crystallized water therefrom, and (f) precipitating the magnesium component from the remaining solution, thereby forming the catalyst component (i.e. solid carrier component). The solid carrier component formed in step (f) is then reacted with a titanium halide, with or without the presence of an internal electron donor, to form a catalyst component which is then combined with the organo-aluminum compound and an external electron donor to catalize the olefine-polymerizing reaction.

The present invention is also directed to a method for manufacturing a catalyst component for an alpha olefine-polymerizing catalyst comprising an organo-aluminum compound, an external electron donor, and a solid catalyst component containing magnesium which is obtained when a solid carrier component containing magnesium has reacted with a titanium halide compound. The method of the present invention is characterized by preparing the catalyst (i.e. solid carrier) component by (a) dissolving a natural or synthetic mineral containing magnesium and aluminum in hydrochloric acid to prepare a solution, (b) evaporating the thus-prepared solution until dry, to obtain a salt mixture, (c) calcinating the thus-obtained salt mixture by heating the same at a temperature of about 130°–150° C. in order to convert the aluminum component into hydroxide, (d) dissolving the magnesium component in ethanol, to form a solution, (e) subjecting the thus-formed ethanolic solution of the magnesium component, to azeotropic distillation to remove crystallized water therefrom, and (f) precipitating the magnesium component from the remaining solution, thereby forming the catalyst (i.e. solid carrier) component. The solid carrier component formed in step (f) is then reacted with the titanium halide compound, with or without the presence of an internal electron donor, to form a catalyst component which is then combined with the organoaluminum compound and external electron donor for carrying out the alpha-olefine polymerizing. The present invention is also directed to a method for polymerizing olefines, especially propylene, in which the polymerizing is carried out in the presence of the catalyst component of the present invention.

The catalyst component of the present invention, and the solid carrier component (which is reacted with the titanium halide to form the catalyst component) of the invention provide several important advantages over carrier components containing magnesium which have been prepared by conventional synthesis techniques. For instance, in manufacturing the carrier component, it is possible to use an open reaction vessel. Moreover, because the synthesis is not sensitive to oxygen and moisture, an inert nitrogen atmosphere is not absolutely essential for the synthesis. In comparison to carriers which have been prepared by halogenating an organic carrier component containing a magnesium compound, it is easier and less expensive to manufacture the carrier component of the present invention. Hydrochloric acid is the cheapest choice of chlorinating medium. Conventional aqueous solutions of hydrochloric acid may be utilized in the preparation of the carrier component of the invention, because the crystal (crystallized) water can be removed quite simply and easily. Moreover, in manufacturing the carrier component, hydrochloric acid can be used in excess because the hydrochloric acid can be removed in the next synthesis step. A further advantage of the catalyst component and method of the invention, is that any magnesium products which may be produced as by-products which impair the properties of the catalyst, such as Mg—HCl, efficiently escape from the catalyst component of the invention.

DESCRIPTION OF THE PREFERRED EMBODIMENTS

The first step in preparing the catalyst component of the invention, involves dissolving a mineral containing magnesium in hydrochloric acid. The mineral may be in the form of powder or granules, however the preferred choice is an aqueous suspension. Most minerals can be mixed with water to form a homogenous suspension, with the use of such suspension being advantageous because it checks the violent reaction when hydrochloric acid is added.

The hydrochloric acid is advantageously added in the form of a concentrated aqueous solution. On addition of hydrochloric acid, the magnesium compound is completely dissolved when the pH of the suspension drops sufficiently. When, for example, hydrotalsite is used for the mineral, a quantity of hydrochloric acid is added such that the pH drops down to at least pH 2, preferably even down to pH 1. If too little hydrochloric acid is added, then a great part of the magnesium may remain undissolved. Hydrotalsite, for instance, acts as a strong buffer and liberates only OH ions until pH 2 has been reached.

After the magnesium mineral has been dissolved in the hydrochloric acid, the solution is then evaporated in the next step until dry. At the same time, the excess quantity of hydrochloric acid evaporates. The salt mixture obtained after evaporation contains the aluminum from the talsite in the form trichloride. Its elimination is essential because it would impede the removal of crystal water from the carrier component at a later stage.

The salt mixture is heated for removing the aluminum salts in accordance with the invention, to a temperature of about 130° to 150° C., whereby decomposition of the aluminum trichloride into aluminum hydroxide and hydrochloric acid ensues. The latter will evaporate during heating. The heating time may be so selected that the aluminum chloride has time to be converted into aluminum hydroxide, while the magnesium component does not have time to be calcinated and decomposed.

The last-noted reaction also imposes an upper limit upon the heating temperature. 0.5 to 5 hours have proven to be an appropriate heating time, preferably about 1–5 hours, more preferably about 1–3 hours, and most preferably about 2 hours, at a temperature of 130°–150° C. Too high a temperature causes decomposition of the magnesium component into magnesium chloride and hydroxide, resulting in lower yield.

After the calcination process, the salt mixture is then dissolved in ethanol, whereby the appropriate magnesium component for the carrier dissolves completely, while the aluminum component in the hydroxide form remains undissolved. The aluminum component can be separated by filtering or by centrifuging from the ethanol solution. Thus, in accordance with the invention, the harmful aluminum and magnesium components can be separated in a simple manner, almost quantitatively, from the magnesium component. At the same time, any other aluminum compounds, such as aluminum oxide, and insoluble magnesium compounds which may be produced in the calcinating process, such as magnesium oxychloride, remain undissolved.

The obtained clear ethanol solution now contains nothing but magnesium component with crystal water. Removal of the crystal water is essential for producing an active catalyst component. In accordance with the invention, the crystal water is removed by distilling with the aid of periodic azeotropic distillation. During this distillation, an azeotropic mixture of alcohol and water escapes from the solution, whereby the water quantity is reduced. By adding new water-free ethanol to the solution and by repeated distillation, total removal of crystal water from the magnesium component is accomplished.

In the present invention, it has been noted that the above calcinating step is essential in order that removal of the crystal water with the aid of azeotropic distillation might be feasible. If the salt mixture obtained after the steps of dissolution in hydrochloric acid and subsequent evaporaton is directly dissolved in the ethanol, then a clear soluton is admittedly obtained, however, this solution is not driable with the aid of azeotropic distillation. This is due to the fact that Al(III) ions possess the ability to bind water in their crystal structure:

$$Al^3 + 6H_2O = Al(H_2O)_6^{+3}$$

This ion further reacts with water, whereby a completely or partially equivalent hydroxide product is produced:

$$Al(H_2O)_6^{+3} + H_2O = Al(H_2O)_6(OH)_2^{2+} + H_3O^+$$

The water which is bound to Al (III) ions in the above forms, is not separable with the aid of azeotropic distilling.

The number of azeotropic distilling runs required depends upon the amount of water present in the solution, and on the intended use of the catalyst. Generally, about 1–15 periodic azeotropic distillation runs are carried out. If the cataylst is intended to be used in polymerizing ethylene, then fewer runs are needed, for instance about 1 to 5 runs. When manufacturing a carrier component for propylene polymerizing, a nearly water-free carrier is required, and it has been found that this is achieved if the number of distilling runs is 8 to 15, advantageously 10 to 12. The water content of the carrier component can then be brought down to 0.3 moles of crystal water, which may be considered the upper limit for propylene-polymerizing catalysts.

After drying out the crystal water, precipitation of the magnesium carrier component is effected by transferring the dried ethanol solution into a cold solvent, whereby the magnesium component will precipitate. Suitable solvents are common organic hydrocarbons used as solvents. Heptane is a highly appropriate solvent for the reason that its boiling point is sufficiently high so that in the titanizing step which has to be carried out subsequently, titanium has time to react, while on the other hand, it is low enough to avoid melting of the carrier component in the titanizing step.

When the ethanol solution containing the magnesium component is added into cold heptane, then the carrier component is precipitated in finely-divided form. After washing and drying, the carrier component is titanized with the aid of titanium tetrachloride in a manner known in and of itself in the art, for producing the catalyst component.

Titanizing may be accomplished by, for instance, mixing the solid carrier component with titanium halide compound once or several times. Before, during, or after the titanizing process, the catalyst component may furthermore be treated with the aid of an internal electron donor compound. The titanizing is preferably accomplished in two steps, between which the internal electron donor may be added, which is usually an amine, ether or ester of its type.

In the first step, a low temperature is recommended, e.g. below 0° C., preferably below −20° C. The second titanizing step may be carried out at a higher temperature, e.g. at about 85° to 110° C., a reaction time of about 1–1.5 hours being sufficient. The solid reaction product is then separated from the liquid phase and washed with hydrocarbon solvents to remove impurities and derivatives. The catalyst component may be dried in a light vacuum or in nitrogen gas at room temperature, or at slightly elevated temperature, and may be further homogenized by grinding in a ball mill.

The catalyst component of the invention may then be used to polymerize alpha olefines by allowing the component to come into contact with an Al and an external compound releasing electrons. As the external compound releasing electrons, amines, ethers, esters (preferably alkyl and arylesters of aromatic carboxylic acid) or silane compounds (alkyl/aryl silanes) may be used, examples such being, among others, the methyl and ethyl esters of benzoic, toluic and phthalic acids, isobutylesters of phthalic acid, triethoxysilane, etc. The electron donors are compounds which are able to enter into complexes with Al alkyls. The stereo-specificity of the catalyst can be improved with their aid.

The external compound releasing electrons or donor, and the Al alkyl are mixed together, the molar proportion of the compound releasing electrons to the Al compound being about 20 and the Al/Ti molar proportion being between 10 and 300, depending upon the polymerizing system. Polymerizing may be carried out either as a slurry or bulk polymerizing, or in the gas phase.

The catalyst component and the catalysts prepared in accordance with the present invention may be used to polymerize alpha olefines such as ethylene, propylene, and butylene, by the slurry, bulk, and gas phase methods. However, the catalyst component of the invention is especially well suited for use in polymerizing propylene, because the quantity of crystal water in the carrier substance is singularly low. As a result, the activity of the catalysts is especially high, particularly regarding polymerizing of propylene.

The invention will be described in greater detail in the following examples:

EXAMPLE 1

17 g hydrotalsite $Mg_4Al_2(OH)_{12}CO_3 3H_2O$ was suspended in 100 ml water. Concentrated hydrochloric acid (38%) was added to the suspension until pH 1.5 was reached. The solution was then evaporated until dry, with the dry solution being heated for 2 hours at 144° C.

After heating, the salt was mixed in 200 ml ethanol. The solution was centrigued for 10 min. at 3000 rpm. The clear solution was transferred into a one-liter three-necked fask, in which the ethanol solution was dried with azeotropic distillation, consuming in total 1200 ml absolute ethanol, which was added in batches of 100 ml.

When the ethanol solution was dry, it was siphoned, while hot into 500 mol of cold heptane (−20° C.), in which crystallization of the carrier component took place. The extra ethanol was extracted from the precipitation by washing with heptane. The carrier component was transferred in to 900 ml cold TiCl₄ (−15° C.). The mixture was allowed to reach room temperature, after which 5 ml of diisobutylphthalate was added thereto, with the mixture then being boiled for one hour at 110° C. The carrier component was allowed to settle, after which the TiCl₄ was siphoned off and replaced with another 900 ml batch. The mixture was boiled and the TiCl₄ was removed from the catalyst as above. Thereafter, the catalyst was washed with heptane (400 ml) five times, the mixture being boiled for 15 min. the first time, for 30 min. the second time, for 15 min. the third time, and for 10 min. the last two times. The washed catalyst was dried in a nitrogen flow. The yield of catalyst was 13 g, and the catalyst contained: Ti 9.0%, Mg 11.0%, Al 0.15%, and Cl⁻53.0%.

The catalyst prepared in the above-described manner was applied in propylene polymerizing. A catalyst which had been prepared by mixing triethylaluminum as aluminum alkyl compound, diphenylmethoxysilane (Al donor mole proportion: 20) as Lewis compound in 50 ml heptane and admixing to this after 5 minutes the carrier component as prepared above so as to make the Al/Ti molar proportion 200, was added into a 2-litre polymerizing reactor. Polymerizing was carried out under conditions as follows: propylene partial pressure 9.0 bar, hydrogen partial pressure 0.3 bar, temperature 70° C., and polymerizing time 3 hrs.

The activity of the catalyst was found to be 6.14 kg PP per g of catalyst in 3 hours. 95% of the polymer particles were in the range 0.2 mm to 1.0 mm in diameter. The bulk density of the polymer was 0.28 g/ml.

EXAMPLE 2

A catalyst component was prepared as in Example 1, with the exception that after dissolving in hydrochloric acid and evaporating until dry, the calcinating period was 4 hours or 5 hours. In the first instance, 12 g of catalyst was produced and it contained: Ti 2.4%, Mg 11.0%, Al 1.0%, and Cl⁻53%. In the latter instance, the yield of catalyst was 11 g, with the catalyst containing: Ti 4.5%, Mg 11.0%, and Al 570 ppm.

The catalysts were used to polymerize propylene in the same manner as in Example 1. In the first instance, the activity was found to be 6.12 kg PP per g of catalyst in 3 hours, while in the latter instance the catalyst activity was 6.06 kg PP per g of catalyst in 3 hours. In both cases, the bulk density of the polymer was 0.3 g/ml, and 95% of the polymer particles were in the range 0.2 to 1.0 mm in diameter.

EXAMPLE 3

17 g hydrotalsite $Mg_4Al_2(OH)_{12}CO_3 3H_2O$ was suspended in 200 ml water. The suspension was titrated with conc. hydrochloric acid (38%) to pH 1. The titrated solution was evaporated until dry, with the remaining salt then dissolved in ethanol. Drying of the carrier component was carried out with the aid of azeotropic distillation. The drying process consumed 1040 ml absolute ethanol (moisture content less than 100 ppm $H_2O$). The distillation took place in a slight nitrogen flow. The dry, cold ethanol solution was transferred into 500 ml of cold heptane ($-20°$ C.), whereby the carrier component crystallized. The carrier component was then processed under inert conditions ($N_2$).

The extra ethanol was extracted with two heptane washings, and the carrier component was thereafter transferred into cold titanium tetrachloride ($-20°$ C.). After the mixture had warmed up to room temperature, 0.1 mol/mol Mg of diisobutylphthalate was added. The mixture was boiled for 1 hour at 110° C., after which the catalyst was allowed to settle and the TiCl4 solution was replaced with new solution and the treatment being repeated. The completed catalyst component was washed with heptane and dried with nitrogen. The yield was 1.0 g and the catalyst component contained: Mg 13.22%, Ti 3.8%, and Cl⁻53.3%.

The catalyst component was used to polymerize propylene as in Example 1, and its activity was found to be 0.5 kg PP per g of catalyst. This test shows that calcination during only a very short period fails to yield catalyst of even satisfactory activity.

EXAMPLE 4

17 g. hydrotalsite $Mg_4Al_2(OH)_{12}CO_3 3H_2O$ was suspended in 100 ml. water. A quantity of conc. hydrochloric acid was added to the suspension, such that the pH of the suspension became 1.5. The solution was thereafter evaporated until dry. The dried salt mixture was not calcinated, and instead was added directly to 200 ml. ethanol with mixing. The ethanol solution was centrifuged for 10 min. at 3000 rpm. The clear solution was transferred into a three-necked flask, in which the ethanol solution was dried with the aid of azeotropic distillation, consuming 1200 ml absolute ethanol added in batches of 100 ml. When the solution was dry, it was siphoned while hot into 500 ml of cold heptane ($-20°$ C.), in which the carrier component crystallized. The extra ethanol was extracted with two heptane washings. The carrier component was transferred into 900 ml cold titanium tetrachloride ($-20°$ C.). The mixture was allowed to reach room temperature, with 5 ml. diisobutylphthalate being added, after which the mixture was boiled for 1 hour at 110° C. The catalyst component was allowed to settle, the TiCl4 was siphoned off and replaced with a new batch.

Finally, the catalyst component was washed with heptane several times. The washed catalyst component was dried in a nitrogen flow. The yield was 1.09% of catalyst component, and it contained: Ti 3.78%, Mg 13.22%, Al 5.24%, and Cl 53.34%.

The catalyst was used to polymerize propylene as in Example 1, and it was observed that its activity was only 1.5 kg PP per g of catalyst in 3 hours. The polypropylene which was obtained was morphologically equivalent with the polymer of Example 1.

This example clearly shows that if the Al-Mg combined salt is not calcinated in accordance with the invention, the Al content in the completed carrier will be high and for this reason the activity of the catalyst will be low.

EXAMPLE 5

17 g. $Mg_4Al_2(OH)_{12}CO_3 3H_2O$ was suspended in 100 ml ethanol, with 45 ml. of conc. hydrochloric acid (38%) being added to the suspension. The solution was evaporated until dry, and the salt mixture was calcinated for 1 hour at 130° C. The salt mixture was then suspended, with mixing, in 100 ml ethanol, maintained under inert conditions, and then transferred with mixing into cold heptane ($-20°$ C), in which the carrier component crystallized.

The extra ethanol was extracted with two heptane washings, after which the carrier component was transferred into 500 ml of cold TiCl4 ($-20°$ C). After the mixture had warmed to room temperature, 0.1 mol/mol Mg diisobutylphthalate was added. The mixture was boiled for 1 hour at 110° C, after which the catalyst component was allowed to settle and the TiC4 solution was replaced with new solution and the process repeated. The completed catalyst component was washed and dried with nitrogen. The yield was minimal. The catalyst was used for propylene-polymerizing, but its activity was nil.

This test shows that the removal of crystal water, in accordance with the invention, is an essential step for producing a functional propylene-polymerizing catalyst.

The preceding description of the present invention is merely exemplary, and is not intended to limit the scope thereof in any way.

We claim:

1. Method for manufacturing a catalyst component for alpha olefine polymerising catalysts comprising an organo-aluminum compound, an external electron donor said component which comprises
    (a) dissolving a natural or synthetic mineral containing magnesium and aluminum in hydrochloric acid, to form a solution,
    (b) evaporating the thus-formed solution until dry to form a salt mixture,
    (c) calcinating the thus-obtained salt mixture by heating the same at a temperature of about 130°–150° C. in order to convert the aluminum component into hydroxy form,
    (d) dissolving the magnesium component in ethanol to form a solution,
    (e) subjecting the thus-obtained ethanolic solution of the magnesium component to azeotropic distillation, to remove crystallized water therefrom, and
    (f) precipitating the magnesium component from the ethanol solution, thereby forming said catalyst component, and
    (g) reacting the thus-precipitated magnesium component with a titanium halide.

2. The method of claim 1, wherein
    (g) the thus-precipitated magnesium component is reacted with the titanium halide in the presence of an internal electron donor.

3. The method of claim 1, wherein
    (a) the mineral containing magnesium and aluminum is hydrotalsite.

4. The method of claim 1, wherein (c) after evaporating (b) the hydrochloric acid solution, the salt mixture is calcinated for about one to five hours.

5. The method of claim 1, wherein
    (a) the mineral containing magnesium and aluminum is dissolved in hydrochloric acid by
        ($a_1$) suspending the mineral in water, and
        ($a_2$) adding to the thus-produced acqueous suspension, hydrochloric acid in a quantity such that the pH drops to pH of about 1–2.

6. The method of claim 10, wherein
    (e) about 1–15 runs of the azeotropic distillation are carried out.

* * * * *